United States Patent [19]
Luftglass et al.

[11] Patent Number: 5,139,754
[45] Date of Patent: * Aug. 18, 1992

[54] CATALYTIC/NON-CATALYTIC COMBINATION PROCESS FOR NITROGEN OXIDES REDUCTION

[75] Inventors: Bryan K. Luftglass, South Salem, N.Y.; William H. Sun, Aurora; John E. Hofmann, Naperville, both of Ill.

[73] Assignee: Fuel Tech, Inc., Rowayton, Conn.

[*] Notice: The portion of the term of this patent subsequent to Jan. 22, 2008 has been disclaimed.

[21] Appl. No.: 626,439

[22] Filed: Dec. 12, 1990

Related U.S. Application Data

[63] Continuation-in-part of Ser. No. 408,122, Sep. 12, 1989, Pat. No. 4,978,514.

[51] Int. Cl.$^5$ .......................... C01B 21/00; B01J 8/00
[52] U.S. Cl. ..................................... 423/235; 423/239
[58] Field of Search ................... 423/235, 235 D, 239, 423/239 D

[56] References Cited

U.S. PATENT DOCUMENTS

| | | | |
|---|---|---|---|
| 4,119,702 | 10/1978 | Azuhata et al. | 423/235 |
| 4,302,431 | 11/1981 | Atsukawa et al. | |
| 4,777,024 | 10/1988 | Epperly et al. | |
| 4,780,289 | 10/1988 | Epperly et al. | |
| 4,830,839 | 5/1989 | Epperly et al. | |
| 4,946,659 | 8/1990 | Held et al. | |
| 4,978,514 | 12/1990 | Hofmann et al. | 423/235 |
| 4,981,660 | 1/1901 | Leach. | |

FOREIGN PATENT DOCUMENTS 2-203923  8/1990  Japan ................................. 423/239

*Primary Examiner*—Gregory A. Heller
*Attorney, Agent, or Firm*—St.Onge Steward Johnston & Reens

[57] ABSTRACT

A process for reducing nitrogen oxides in a combusiton effluent is presented. The process involves introducing a nitrogenous treatment agent into the effluent under conditions effective to create a treated effluent having reduced nitrogen oxides concentration such that ammonia is present in the treated effluent; and then contacting the treated effluent under conditions effective to reduce the nitrogen oxides in the effluent with a nitrogen oxides reducing catalyst.

25 Claims, No Drawings

CATALYTIC/NON-CATALYTIC COMBINATION PROCESS FOR NITROGEN OXIDES REDUCTION

RELATED APPLICATION

This application is a continuation-in-part of copending and commonly assigned U.S. patent application entitled "Combined Catalytic/Non-Catalytic Process for Nitrogen Oxides Reduction", having Ser. No. 07/408,122, filed in the names of Hofmann, Sun, and Luftglass, on Sep. 12, 1989, now U.S. Pat. No. 4,978,514 the disclosure of which is incorporated herein by reference.

TECHNICAL FIELD

The present invention relates to a process for reducing nitrogen oxides ($NO_x$) in the effluent from the combustion of carbonaceous fuels and other organic matter. The process utilizes a combination of catalytic and non-catalytic processes to achieve reductions in nitrogen oxides in an efficient, economical and safe manner not before seen.

Carbonaceous fuels can be made to burn more completely, and with reduced emissions of carbon monoxide (CO) and unburned hydrocarbons, when the oxygen concentrations and air/fuel ratios employed are those which permit high flame temperatures. When fossil fuels are used in suspension fired boilers such as large utility boilers, temperatures above about 2000° F. and typically about 2200° F. to about 3000° F. are generated. Unfortunately, such high temperatures, as well as hot spots of higher temperatures, tend to cause the production of thermal $NO_x$, the temperatures being so high that free radicals of oxygen and nitrogen are formed and chemically combine as nitrogen oxides. $NO_x$ can also be formed as the result of oxidation of nitrogen containing species in the fuel, such as those found in heavy fuel oil, municipal solid waste and coal. $NO_x$ can form even in circulating fluidized bed boilers which operate at temperatures which typically range from 1300° F. to 1700° F.

Nitrogen oxides are troublesome pollutants which are found in the combustion effluent streams of boilers and other combustion units when fired as described above, and comprise a major irritant in smog. It is further believed that nitrogen oxides contribute to tropospheric ozone, a known threat to health, and can undergo a process known as photochemical 'smog formation, through a series of reactions in the presence of sunlight and hydrocarbons. Moreover, nitrogen oxides comprise a significant contributor to acid rain, and have been implicated as contributing to the undesirable warming of the atmosphere, commonly referred to as the "greenhouse effect."

Recently, many processes for the reduction of $NO_x$ in combustion effluents have been developed. They can generally be segregated into two basic categories: selective and non-selective Among the selective processes, which are believed in the art to be the more desirable, there is a further division between selective catalytic reduction (SCR) and selective non-catalytic reduction (SNCR) processes.

SCR processes generally involve passing the nitrogen oxides-laden effluent across a catalyst bed in the presence of ammonia, to achieve $NO_x$ reductions as high as 50% or even as high as 95% or higher. SNCR processes involve the introduction of $NO_x$-reducing treatment agents into the effluent to achieve reductions of up to 50% or greater.

Unfortunately, both SCR and SNCR processes have been found to have certain drawbacks With respect to SCR, the expense of installing and operating the catalyst system causes such processes to be of limited economic sense, even considering the high nitrogen oxides reductions achieved With respect to SNCR, the most significant $NO_x$ reductions, which fall below those of SCR processes, are achieved by introduction of a nitrogenous treatment agent and/or a hydrocarbon treatment agent, which can lead to the generation and emission of ammonia ($NH_3$) and/or carbon monoxide, which are pollutants in and of themselves.

BACKGROUND ART

As noted, processes and compositions for the reduction of nitrogen oxides in effluents from the combustion of carbonaceous fuels have been developed extensively over recent years. With the increased attention to the health risks and environmental damage caused by agents such as smog and acid rain, it is expected that $NO_x$ reduction research will continue to be pursued.

In the past, most SNCR processes for reducing nitrogen oxides levels have concentrated on achieving maximum $NO_x$ reductions without addressing the problems raised by the production of other pollutants, such as ammonia and carbon monoxide More recently, in a unique application of nitrogen oxides reducing principles, Epperly, Peter-Hoblyn, Shulof, Jr., and Sullivan, in U.S. Pat. No. 4,777,024, disclose a method of achieving substantial nitrogen oxides reductions without the production of a major amount of other pollutants through a multiple stage treatment agent injection process Although minimizing the production of other pollutants, this process, like any process which involves the high temperature introduction of nitrogenated compounds such as urea or ammonia, will still generate some other pollutants.

This is also the case with the method of U.S. Pat. No 4,780,289, issued to Epperly, O'Leary and Sullivan, which discloses another method for maximizing $NO_x$ reductions while minimizing other pollutants. Although minimized, such other pollutants are still present.

In U.S. Pat. No. 4,302,431, Atsukawa et al. disclose a process for nitrogen oxides reduction involving introducing ammonia into an exhaust gas at 700° C. (1292° F.) to 1300° C. (2372° F.), and then passing the exhaust gas over a catalyst at a temperature between 300° C. (572° F.) and 500° C. (932° F.) (preferably with the introduction of additional ammonia) to decompose remaining $NO_x$ and ammonia. This process, though, involves the introduction of ammonia into the exhaust gas with the concommitant toxicity and handling problems of ammonia.

What is desired, therefore, is a process for nitrogen oxides reduction which can achieve substantial reductions in $NO_x$ while avoiding the emission of other pollutants and without the necessity for storage and handling of ammonia.

DISCLOSURE OF INVENTION

The first aspect of the claimed process comprises introducing into the effluent from the combustion of a carbonaceous fuel at least one treatment agent which comprises a nitrogenous composition under conditions effective to reduce the nitrogen oxides concentration in the effluent. The treatment agent is introduced such that the treated effluent (i.e., after treatment with the treatment agent) contains ammonia. The second part of the process involves passing the effluent over a catalyst bed wherein the effluent ammonia is available to be consumed in the catalyzed reduction of $NO_x$.

As noted, in the process of the present invention a treatment agent is introduced into the effluent from the combustion of a carbonaceous fuel. This treatment agent comprises a nitrogenous composition, by which is meant a composition having at least one component containing as an element thereof nitrogen The reduction of nitrogen oxides by such treatment agents comprises a selective, free radical-mediated process, often referred to as selective non-catalytic reduction (SNCR). Suitable nitrogenous compositions for use as the treatment agent include ammonia such as disclosed by Lyon in U.S. Pat. No. 3,900,554 and urea such as disclosed by Arand et al. in either of U.S. Pat. Nos. 4,208,386 and 4,325,924 the disclosures of each of which are incorporated herein by reference. As noted, the toxicity and instability of ammonia leads to extreme difficulties in transportation, storage and handling. Because of this, urea is much preferred as the nitrogenous treatment agent of this invention.

Additional appropriate nitrogenous treatment agent and methods known as being effective for the reduction of nitrogen oxides include those disclosed by International Patent Application entitled "Reduction of Nitrogen- and Carbon-Based Pollutants Through the Use of Urea Solutions," having Publication No. WO 87/02025, filed in the name of Bowers on Oct. 3, 1986; U.S. Pat. No. 4,719,092, to Bowers; U.S. Pat. No. 4,927,612, also to Bowers; U.S. Pat. No. 4,770,863 to Epperly and Sullivan; U.S. Pat. No. 4,888,165 to Epperly and Sullivan; U.S. Pat. No. 4,877,591 to Epperly and Sullivan; U.S. Pat. No. 4,803,059 to Sullivan and Epperly; U.S. Pat. No. 4,863,705 to Epperly, Sullivan and Sprague; U.S. Pat. No. 4,844,878 to Epperly, Epperly and Sullivan; International Patent Application entitled "Composition for Introduction into a High Temperature Environment," having Publication No. WO 1089/182, filed in the names of Epperly, Sprague and von Harpe on Apr. 28, 1989; U.S. Pat. No. 4,902,488 to Epperly, O'Leary, Sullivan and Sprague; U.S. Pat. No. 4,863,704 to Epperly, Peter-Hoblyn, Shulof, Jr., Sullivan and Sprague; U.S. Pat. No. 4,873,066 to Epperly, Sullivan and Sprague; copending and commonly assigned U.S. patent application entitled "Hybrid Process for Nitrogen Oxides Reduction," having Ser. No. 07/395,810, filed in the names of Epperly and Sprague on Aug. 18, 1989; copending and commonly assigned U.S. patent application entitled "Process for Reducing Nitrogen Oxides Without Generating Nitrous Oxide", having Ser. No. 07/489,919, filed in the names of Hofmann, Sprague, and Sun on Mar. 7, 1990; and copending and commonly assigned U.S. patent Application entitled "Process for the In-Line Hydrolysis of Urea", having Ser. No. 07/561,154, filed in the names of von Harpe and Pachaly on Aug. 1, 1990, the disclosures of each of which are incorporated herein by reference.

These patents and applications contemplate the use of treatment agents which comprise urea (or one or more of its hydrolysis products such as ammonium carbamate, ammonium carbonate, and mixtures of ammonia and ammonium bicarbonate) or ammonia (or compounds which produce ammonia as a by-product such as ammonium salts like ammonium formate and ammonium oxalate), optionally enhanced by other compositions such as hexamethylenetetramine (HMTA), oxygenated hydrocarbons such as ethylene glycol, ammonium salts of organic acids such as ammonium acetate and ammonium benzoate, heterocyclic hydrocarbons having at least one cyclic oxygen such as furfural, sugar, molasses, 5- or 6-membered heterocyclic hydrocarbons having at least one cyclic nitrogen such as pyridine and pyrolidine, hydroxy amino hydrocarbons such as milk or skimmed milk, amino acids, proteins and monoethanolamine and various other compounds which are disclosed as being effective at the reduction of nitrogen oxides in an effluent.

Most preferred among these enhancers are the oxygenates, such as the oxygenated hydrocarbons, heterocyclic hydrocarbons having at least one cyclic oxygen, sugar and molasses. In fact, several of the enhancers, especially the oxygenates and certain of the ammonium salts, can function as $NO_x$-reducing treatment agents in an independent introduction without urea or ammonia. Of course, it will be recognized that a non-nitrogenous treatment agent will not lead to the presence of ammonia in the effluent as desired, explained in more detail below. Accordingly, such a treatment agent should be introduced as an adjunct to a nitrogenous treatment agent.

As noted, these treatment agents can be introduced according to processes which maximize the nitrogen oxides reductions achieved while minimizing the production of other pollutants. Such processes are described in, for instance, U.S. Pat. No. 4,777,024 to Epperly, Peter-Hoblyn, Shulof, Jr. and Sullivan and U.S. Pat. No. 4,780,289 to Epperly, O'Leary and Sullivan as well as International Patent Application entitled "Multi-Stage Process for Reducing the Concentration of Pollutants in an Effluent," having Publication No. WO 89/02780, filed in the names of Epperly, Peter-Hoblyn, Shulof, Jr. and Sullivan on Aug. 12, 1988; and International Patent Application entitled "Process for Nitrogen Oxides Reduction and Minimization of the Production of Other Pollutants," having Publication No. WO 89/02781, filed in the names of Epperly, Sullivan, Sprague and O'Leary on Aug. 12, 1988, the disclosures of each of which are incorporated herein by reference.

When the treatment agent comprises urea, ammonia or another nitrogenous treatment agent, without a non-nitrogenous hydrocarbon component, it is preferably introduced at an effluent temperature of about 1600° F. to about 2100° F., more preferably about 1700° F. to about 2100° F. In fact, depending on parameters such as concentration and droplet size, effective nitrogen oxides reductions can be achieved using urea at temperatures above about to 2100° F. When the treatment agent also comprises one of the enhancers discussed above, it can be introduced at an effluent temperature of about 1200° F. to about 1750° F., more preferably about 1350° F. to about 1750° F. or higher.

These effluent temperatures at the point of introduction can be varied depending on the amount of ammonia desired, particular components of the treatment agent, and other effluent conditions, such as the effluent oxygen level, as discussed in more detail below. In fact, the use of an enhancer will generally reduce the level of ammonia in the effluent. If the enhancer reduces the ammonia level to below that desired for the catalyzed $NO_x$ reduction reaction, the enhancer can be introduced at a lower level, or not at all, so that sufficient ammonia is present.

The treatment agent is introduced into the effluent at a molar ratio of the nitrogen in the treatment agent to the baseline nitrogen oxides level in the effluent of about 1:10 to about 10:1. More preferably, the molar ratio of treatment agent nitrogen to baseline $NO_x$ level is about 1:5 to about 5:1 (in the situation where enhancers are introduced without a nitrogenous component, they are introduced at a weight ratio of about 1:10 to about 10:1, preferably about 1:5 to about 5:1). By "baseline nitrogen oxides level" is meant the level (measured or calculated) of nitrogen oxides in the effluent prior to introduction of the treatment agent. Such a baseline $NO_x$ level can also be used in calculating the percentage of nitrogen oxides reduced by measuring the level of nitrogen oxides in the effluent after treatment, dividing that number by the baseline nitrogen oxides level, subtracting from unity and multiplying by 100 to give the $NO_x$ reduction expressed as percentage of baseline.

As will be discussed in more detail below, it is important that after introduction of the treatment agent, the effluent contains ammonia in the molar ratio of ammonia to $NO_x$ which remains in the effluent of about 1:10 to about 10:1, more preferably about 1:2 to about 2:1. In this way, sufficient ammonia will be present in the effluent to react with the remaining effluent $NO_x$ in the reaction catalyzed by the catalyst, such that both ammonia and nitrogen oxides are decomposed and rendered safe for discharge into the atmosphere.

This can be ensured by varying the effluent temperature (by, for instance, adjusting the location at which the introduction occurs), specific composition and introduction ratio of the treatment agent. These parameters should be adjusted to provide the desired molar ratio of ammonia to nitrogen oxides in the effluent. This can be accomplished using the process and techniques described in U.S. Pat. No. 4,780,289 and/or U.S. Pat. No. 4,830,839 (the disclosure of which is incorporated herein by reference), which utilize the nitrogen oxides reduction versus effluent temperature curve of a treatment agent to control the presence of secondary pollutants such as ammonia while reducing $NO_x$.

The introduction temperature of a treatment agent, especially a nitrogeneous treatment agent, has predictable effects on both nitrogen oxides reductions achieved and on the amount of ammonia remaining in the effluent after introduction of the treatment agent. With knowledge of this information, the nature (i.e., composition) and introduction of the treatment agent can be carefully coordinated to produce the desired amount of ammonia in the effluent even where the choice of introduction temperatures cannot be altered (in many boilers, retrofitting or providing access for different injection levels is not always possible or economically feasible). Typically, this involves introducing a treatment agent such that it is acting on the "left" side of the plateau of its nitrogen oxides reduction versus effluent temperature curve at the effluent temperature at the point of introduction, in order to generate sufficient ammonia for the catalytic aspect of the process.

The introduction rate or other equivalent parameters such as the normalized stoichiometric ratio can also be adjusted to provide the desired ammonia levels (by normalized stoichiometric ratio is meant the ratio of the concentration of theoretically available reducingradicals such as $NH_2$ or NCO radicals to the concentration of nitrogen oxides in the effluent; alternatively, the molar ratio of the treatment agent to the $NO_x$ concentration can be used in place of NSR when the chemistry of reduction is not well defined; the term NSR as used herein will also be understood to encompass molar ratio when appropriate).

Unfortunately, tailoring the non-catalytic aspect of the process such that a certain desired amount of ammonia remains present in the effluent may result in carbon monoxide also being present in the effluent. Although carbon monoxide can be minimized by the processes described above, the presence of carbon monoxide parallels the presence of ammonia especially when the treatment agent comprises an oxygenate enhancer previously mentioned. That is, when ammonia is present in the effluent as the result of the introduction of a treatment agent for $NO_x$ reduction carbon monoxide may also be present; therefore, tailoring the process of this invention such that ammonia remains in the effluent in certain amounts, may lead to the presence of carbon monoxide. As will be discussed in more detail below, the catalytic portion of this process can be tailored to also decompose carbon monoxide, which is likewise considered to be an undesirable pollutant.

In addition, the presence of carbon monoxide in the effluent can, in certain circumstances, function as an "internal enhancer" and thereby eliminate the need for the enhancers discussed above. Under certain combustion conditions and in certain boilers, as will be understood by the skilled artisan, carbon monoxide is formed independent of any nitrogen oxides-reducing processes effected. Although undesirable in most cases, it has been found that the presence of carbon monoxide at the point of chemical injection can be advantageous since the need for an enhancer is avoided, with concommitant economic benefits.

After introduction of the treatment agent, the treated effluent, which now contains ammonia, is passed over a catalyst. The catalyst used is one known to the skilled artisan, for instance vanadium oxide, tungsten oxide, titanium oxide, iron oxide, copper oxide, manganese oxide, chromium oxide, noble metals such as platinum group metals like platinum, palladium, rhodium and iridium, or mixtures of these, on a support such as a ceramic or a zeolite. By passing the effluent, typically at a temperature of about 400° F. to about 1000° F., over this catalyst in the presence of ammonia, nitrogen oxides are further reduced in the effluent. By having tailored the non-catalytic portion of the process to provide sufficient ammonia for the catalytic step, the need for injection of ammonia for the catalyst reaction is eliminated, thusly eliminating the need for storage and handling of ammonia and the ammonia injection grid.

When carbon monoxide is also present in the effluent, it can be decomposed by the use of a carbon monoxide catalyst as part of the catalyst bed. Such a catalyst is known in the art and can comprise oxides of metals such as cobalt, molybdenum, chromium, manganese, copper, silver, iron, nickel and vanadium; noble metals such as platinum group metals, like platinum, palladium, rhodium and iridium; or mixtures of these, on a support such as the oxides of aluminum or silicon, a ceramic or a zeolite. Such a CO catalyst can be utilized as an individual unit either upstream or downstream from the $NO_x$-reducing catalyst installation, or in alternating beds with the $NO_x$-reducing catalyst installation. In fact, the carbon monoxide catalyst can also be combined with the $NO_x$ catalyst into a single unit.

The particular components chosen depends on the temperature at which the CO catalyst is expected to operate. For instance, a particular metal oxide or combination of metal oxides which is effective at ammonia-facilitated $NO_x$ reduction at 400° F. to 1000° F., may also be effective at CO reduction at lower temperatures. Likewise, a particular metal oxide or combination of metal oxides which is effective at CO reduction at 400° F. to 1000° F. will not be effective for $NO_x$ reduction at those temperatures. The catalyst chosen for carbon monoxide reduction will depend on whether it is desired that the CO catalyst be interspersed or combined with the $NO_x$-reducing catalyst, in which case it is likely the catalyst components will be ineffective at $NO_x$ reduction, or up-or downstream from the $NO_x$-reducing catalyst, in which case it is possible the catalyst components will be similar to those of the $NO_x$-reducing catalyst.

The use of the process of this invention to achieve target levels of nitrogen oxides reductions creates a lessened need for catalyst as compared to an SCR process when used alone. For example, if a 90% reduction in $NO_x$ is desired, the initial portion of the process can reduce about 50% to 60% of the nitrogen oxides, which thereby lessens the burden on the catalytic portion from 90% to less than about 80%. This 10% change represents an increase in the space velocity (the ratio of flue gas flow to catalyst volume) by a factor of up to 2, or, in other words, leads up to a 50% reduction in catalyst volume needed for a given flue gas flow. Such a reduction substantially increases the practicality and economy of the process since the catalyst is by far the most expensive part.

Moreover, the use of less catalyst reduces the amount of spent catalyst which must be disposed of. As is well known in the art, the disposal of spent catalyst is difficult due to the environmental concerns engendered thereby. Since typical SCR catalysts are oxides of heavy metals as noted above, disposal is costly and tightly regulated. By the reduction of catalyst volume by 50% or greater, these concerns are significantly reduced.

The process of the present invention can lead to substantially improved efficiency and economy of $NO_x$ reduction, especially where significant reductions are desired. For instance, if the boiler in question is a coal fired boiler of the type used by various industries and electric utilities to generate power, steam and process heat, exemplary units of which are based on pulverized coal, stoker-fired and circulating fluidized bed designs among others, the effluent from the unit could theoretically contain a level of nitrogen oxides amounting to 0.9 pounds of $NO_x$ per million British Thermal Units (MMBTU) heat input or even higher. Based on various local regulations, or for other reasons, it may be necessary to reduce the amount of $NO_x$ by 90%, to 0.09 pounds $NO_x$/MMBTU. If this were to be accomplished using SCR technology alone, for instance a catalyst consisting of vanadium oxide, iron oxide, copper oxide, manganese oxide, chromium oxide, noble metals such as platinum group metals like platinum, palladium rhodium and iridium, on a support such as zeolites or other commercial developmental and theoretical materials on which it can be shown that $NO_x$ is reduced, it can be calculated using cost figures as of the filing date of this application that the required $NO_x$ reduction would cost a total of about $39,700,000 per year for a 500 megawatt (mw) coal fired unit, which calculates as about $2,300 per ton of nitrogen oxides removed.

Using the process of the present invention, though, can substantially reduce this cost. For instance, the level of nitrogen oxides can be reduced by about 50% to 0.45 pounds per MMBTU by introduction of a first treatment agent and a catalyst can then be used to reduce this level by about 80% to the desired level of 0.09 pounds/MMBTU. On a 500 mw coal fired system, it can be shown that the inventive process results the need for about 50% of the catalyst needed if SCR alone were used and in annual costs of about $23,300,000, or almost one half the cost when SCR is used alone. The $NO_x$ reduction cost drops to about $1,355 per ton of $NO_x$ removed, a savings of about 40%. The calculations behind these savings are based upon Example I and are illustrated in Table 1.

TABLE 1

| EXAMPLE | UTILITY BOILER | |
|---|---|---|
| Fuel | Coal | |
| Rating | 500 MW | |
| Baseline $NO_x$ | 0.9 lb/MMBTU | |
| Desired $NO_x$ | 0.09 lb/MMBTU | |
| PROCESS | SCR Alone | Inventive Process |
| Investment, $MM | 69.0 | 44.0 |
| Annualized Investment, $MM/Year | 12.1 | 7.7 |
| Operating Costs, $MM/year | | |
| Chemical | 1.0 | 2.2 |
| Material, Utilities, Labor & Overhead | 26.6* | 13.4* |
| Total Annual Cost, $MM/Year | 39.7 | 23.3 |
| $/Ton of $NO_x$ Removed | 2310 | 1355 |

*Includes catalyst replacement.

To take another example, it can be seen in a natural gas fired boiler widely used by industries and utilities to produce power, steam or process heat, cost savings can accrue using the process of the present invention versus SCR alone. In one case where initial nitrogen oxide effluent levels of 0.14 pounds/MMBTU need to be reduced by 80% to 0.028 pounds/MMBTU, SCR systems (based on conventional, non-conventional or developmental catalysts, e.g., of the types noted above) result in application costs for a 100 MMBTU/hour boiler which could total $180.000 annually or $3,660 per ton of $NO_x$ removed. Instead, by utilizing the process of the present invention, 50% reduction of nitrogen oxides (from 0.14 to 0.07 pounds/MMBTU) by introduction of a nitrogenous treatment agent is achieved with 60% reduction from that level to 0.028 pounds/MMBTU using the catalyst. It can be shown that a catalyst volume of 60% is all that is required and that total costs may be about $120,000 per year or about $2,460 per ton of $NO_x$ removed, a cost savings of about 33% (see Example II and Table 2).

TABLE 2

| EXAMPLE | UTILITY BOILER | |
|---|---|---|
| Fuel | Natural Gas | |
| Rating | 100 MMBTU/Hour | |
| Baseline $NO_x$ | 0.14 lb/MMBTU | |
| Desired $NO_x$ | 0.028 lb/MMBTU | |
| PROCESS | SCR Alone | Inventive Process |
| Investment, $M | 623.0 | 281.0 |
| Annualized Investment, $M/Year | 109.0 | 49.0 |
| Operating Costs, $M/year | | |
| Chemical | 7.0 | 15.0 |
| Material, Utilities, Labor & Overhead | 64.0* | 56.0* |

TABLE 2-continued

| | | |
|---|---|---|
| Total Annual Cost, $M/Year | 180.0 | 120.0 |
| $/Ton of $NO_x$ Removed | 3660 | 2460 |

*Includes catalyst replacement.

These increases in economy and efficiency can also be shown when the process of this invention is used in place of SCR for other boilers, process heaters, turbines and other combustion units fired with oil, other hydrocarbons, other fossil fuels, waste gases, liquids and solids, such as municipal waste, wood waste, petroleum, coke, etc. In all cases since some of the cost burden of SCR is replaced by lower cost non-catalytic processes and since the non-catalytic system can be tailored to optimize the overall urea/ammonia/$NO_x$ ratios to maximize cost effectiveness, then the system provides a unique solution to a variety of nitrogen oxides reduction problems.

By the use of this system, ammonia which is needed for efficient operation of the catalyst system is provided by the non-catalytic process which performs the dual function of achieving substantial $NO_x$ reductions and providing ammonia for the catalyst without the need for the handling and storage problems inherent in a system which requires introduction of ammonia. Moreover, the inventive process provides a means for decomposing carbon monoxide which will also be formed under certain conditions during the generation of ammonia in the non-catalytic process. In this way, neither carbon monoxide nor ammonia is released to the atmosphere to a substantial extent, yet ammonia is available for the catalytic process.

BEST MODE FOR CARRYING OUT THE INVENTION

The following examples further illustrate and explain the invention by describing the design of an operation of an installation using the inventive process, as compared to SCR alone.

DESIGN EXAMPLE I

The boiler used is a 500 megawatt (MW) coal-fired boiler utilizing bituminous coal (26 MMBTU/Ton) which is fired at a rate of 5300 MMBTU/Hour. It is found that the baseline level of nitrogen oxides in the effluent is 4770 lbs/hour, or 0.9 lb/MMBTU, and it is desired that this level be reduced by 90% to 477 lb/hour, or 0.09 lb/MMBTU.

a) When using SCR alone, the effluent is passed over a catalyst comprising vanadium oxide on a ceramic honeycomb support. The catalyst is placed in a location where the effluent is at a temperature of about 800° F. and ammonia is injected at a rate of 1940 lbs/hour. The ammonia slip resulting is 50 parts per million (ppm) and the Space Velocity necessary for achieving reduction of $NO_x$ by 90% (or 0.81 lb/MMBTU) is found to be 6000 hour-$^{-1}$.

b) When using the inventive process, a 10% aqueous solution of urea is first injected into the effluent at a rate of 7738 lbs of urea/hour at a location where the effluent temperature is about 1700° F. to reduce the $NO_x$ by 62%, or 0.56 lb/MMBTU and to generate ammonia at the rate of 526 lbs/hour or 0.099 lbs/MMBTU. The effluent is then passed over the catalyst as described above, except that ammonia is not injected. The ammonia slip resulting is 5 ppm and the Space Velocity necessary for achieving reduction of $NO_x$ by a further 74% (or 0.25 lb/MMBTU) from 0.34 lb/MMBTU to 0.09 lb/MMBTU is 11,000 hour-$^{-1}$.

DESIGN EXAMPLE II

The boiler used is a 100 MMBTU/hour natural gas-fired boiler utilizing natural gas (1,000 BTU/Standard Cubic Feet, SCF) which is fired at a rate of 100,000 SCF/hour.

It is found that the baseline level of nitrogen oxides in the effluent is 14 lbs/hour, or 0.14 lb/MMBTU, and it is desired that this level be reduced by 80% to 2.8 lb/hour, or 0.028 lb/MMBTU.

a) When using SCR alone, the effluent is passed over a catalyst comprising vanadium oxide on a ceramic honeycomb support. The catalyst is placed in a location where the effluent is at a temperature of about 800° F. and ammonia is injected at a rate of 4.4 lbs/hour. The ammonia slip resulting is 5 ppm and the Space Velocity necessary for achieving reduction of $NO_x$ by 80% (or 0.112 lb/MMBTU is found to be 8500 hour-$^{-1}$.

b) When using the inventive process, a 10% aqueous solution of urea is first injected into the effluent at a rate of 19.72 lbs of urea/hour at a location where the effluent temperature is about 1700° F. to reduce the $NO_x$ by 54%, or 0.076 lb/MMBTU and to generate ammonia at the rate of 1.3 lbs/hour or 0.013 lbs/MMBTU. The effluent is then passed over the catalyst as described above, except that ammonia is not injected. The ammonia slip resulting is less than 2 ppm and the Space Velocity necessary for achieving reduction of $NO_x$ by a further 57% (or 0.036 lb/MMBTU) from 0.064 lb/MMBTU to 0.028 lb/MMBTU is 18,000 hour-$^{-1}$.

The above description is for the purpose of teaching the person of ordinary skill in the art how to practice the present invention, and it is not intended to detail all of those obvious modifications and variations of it which will become apparent to the skilled worker upon reading the description. It is intended, however that all such obvious modifications and variations be included within the scope of the present invention which is defined by the following claims.

We claim:

1. A process for the reduction of nitrogen oxides in the effluent from the combustion of a carbonaceous fuel, the process comprising;
    a) introducing a nitrogenous treatment agent comprising urea, one or more of the hydrolysis products of urea, ammonia, compounds which produce ammonia as a by-product, ammonium salts of organic acids, 5- or 6-membered heterocyclic hydrocarbons having at least one cyclic nitrogen, hydroxy amino hydrocarbons, or mixtures thereof into the effluent at an effluent temperature between about 1200° F. and about 2100° F. to create a treated effluent having reduced nitrogen oxide concentration, wherein said nitrogenous treatment agent is introduced such that ammonia is present in the treated effluent; and
    b) contacting the treated effluent under conditions effective to reduce the nitrogen oxides in the effluent with a catalyst effective for the reduction of nitrogen oxides in the presence of ammonia.

2. The process of claim 1 wherein said nitrogenous treatment agent comprises urea.

3. The process of claim 2 wherein said nitrogenous treatment agent is introduced at an effluent temperature of about 1700° F. to about 2100° F.

4. The process of claim 2 wherein said first treatment agent further comprises an enhancer selected from the group consisting of an oxygenated hydrocarbon, a heterocyclic hydrocarbon having at least one cyclic oxygen, sugar, molasses and mixtures thereof.

5. The process of claim 4 wherein said nitrogenous treatment agent is introduced at an effluent temperature of about 1350° F. to about 1750° F.

6. The process of claim 2 wherein said nitrogenous treatment agent is introduced at a molar ratio of treatment agent nitrogen to effluent baseline nitrogen oxides level of about 1:10 to about 10:1.

7. The process of claim 6 wherein said nitrogenous treatment agent is introduced at molar ratio and a temperature wherein the molar ratio of ammonia in the treated effluent to nitrogen oxides in the treated effluent is about 1:10 to about 10:1.

8. The process of claim 7 wherein the conditions under which said nitrogenous treatment agent is introduced comprise introducing said nitrogenous treatment agent at a temperature wherein substantial nitrogen oxides reduction are achieved yet ammonia is generated for said catalyst.

9. The process of claim 8 wherein said nitrogenous treatment agent is introduced on the left side of the plateau of the nitrogen oxides reduction versus effluent temperature curve of said nitrogenous treatment agent.

10. The process of claim 1 wherein said nitrogen oxides-reducing catalyst comprises a metal compound selected from the group consisting of platinum, palladium, rhodium, iridium, vanadium, titanium, iron, copper, manganese and oxides and mixtures thereof, on a support.

11. The process of claim 10 wherein the effluent, when contacted with said catalyst, is at a temperature of about 400° F. to about 1000° F.

12. The process of claim 1 which further comprises contacting the treated effluent with a catalyst effective for the reduction of carbon monoxide in the effluent.

13. A process for the reduction of nitrogen oxides in the effluent from the combustion of a carbonaceous fuel to a predetermined level, the process comprising:
 a. selecting a desired level of nitrogen oxides in the effluent;
 b. introducing a nitrogenous treatment agent comprising urea, one or more of the hydrolysis products of urea, ammonia, compounds which produce ammonia as a by-product, ammonium salts of organic acids, 5- or 6-membered heterocyclic hydrocarbons having at least one cyclic nitrogen, hydroxy amino hydrocarbons, or mixtures thereof into the effluent at an effluent temperature between about 1200° F. and about 2100° F. to at least partially reduce the nitrogen oxides level in the effluent to said desired level, wherein said nitrogenous treatment agent is also effective to cause ammonia to be present in the effluent;
 c. contacting the ammonia-containing effluent with a catalyst effective for the reduction of nitrogen oxides in the effluent in the presence of ammonia to said desired level.

14. The process of claim 13 wherein said nitrogenous treatment agent comprises urea.

15. The process of claim 14 wherein said nitrogenous treatment agent is introduced at an effluent temperature of about 1700° F. to about 2100° F.

16. The process of claim 15 wherein said nitrogenous treatment agent further comprises an enhancer selected from the group consisting of an oxygenated hydrocarbon, a heterocyclic hydrocarbon having at least one cyclic oxygen, sugar, molasses and mixtures thereof.

17. The process of claim 16 wherein said nitrogenous treatment agent is introduced at an effluent temperature of about 1350° F. to about 1750° F.

18. The process of claim 14 wherein said nitrogenous treatment agent is introduced at a molar ratio of treatment agent nitrogen to effluent baseline nitrogen oxides level of about 1:10 to about 10:1.

19. The process of claim 18 wherein said nitrogenous treatment agent is introduced at molar ratio and a temperature wherein the molar ratio of ammonia in the treated effluent to nitrogen oxides in the treated effluent is about 1:10 to about 10:1.

20. The process of claim 13 wherein the conditions under which said nitrogenous treatment agent is introduced are effective to generate sufficient ammonia for said catalyst.

21. The process of claim 13 wherein the conditions under which said nitrogenous treatment agent is introduced comprise introducing said nitrogenous treatment agent at a temperature wherein substantial nitrogen oxides reductions are achieved yet ammonia is generated for said catalyst.

22. The process of claim 21 wherein said nitrogenous treatment agent is introduced on the left side of the plateau of the nitrogen oxides reduction versus effluent temperature curve of said nitrogenous treatment agent.

23. The process of claim 13 wherein said nitrogen oxides-reducing catalyst comprises a metal compound selected from the group consisting of platinum, palladium, rhodium, iridium, vandium, titanium, copper, iron and manganese and oxides and mixtures thereof, on a support.

24. The process of claim 23 wherein the effluent, when contacted with said catalyst, is at a temperature of about 400° F. to about 1000° F.

25. The process of claim 13 which further comprises contacting the treated effluent with a catalyst effective for the reduction of carbon monoxide in the effluent.

* * * * *

UNITED STATES PATENT AND TRADEMARK OFFICE
CERTIFICATE OF CORRECTION

PATENT NO. : 5,139,754

DATED : August 18, 1992

INVENTOR(S) : Bryan K. Luftglass et al

It is certified that error appears in the above-indentified patent and that said Letters Patent is hereby corrected as shown below:

At column 3, line 31, insert --U.S. Patent No. 4,751,065 in the name of Bowers;-- immediately following "filed in the name of Bowers on October 3, 1986;".

At column 3, line 41, "WO 1089/182" should read --WO 89/10182--.

Signed and Sealed this

Twenty-fourth Day of August, 1993

Attest:

BRUCE LEHMAN

Attesting Officer     Commissioner of Patents and Trademarks